(12) United States Patent
Zhao et al.

(10) Patent No.: US 11,641,688 B2
(45) Date of Patent: May 2, 2023

(54) INFORMATION OBTAINING METHOD AND DEVICE

(71) Applicant: Huawei Technologies Co., Ltd., Shenzhen (CN)

(72) Inventors: Weixing Zhao, Shanghai (CN); Yan Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/102,206

(22) Filed: Nov. 23, 2020

(65) Prior Publication Data

US 2021/0076443 A1 Mar. 11, 2021

Related U.S. Application Data (63) Continuation of application No. PCT/CN2018/088239, filed on May 24, 2018.

(51) Int. Cl.
*H04M 3/16* (2006.01)
*H04W 76/19* (2018.01)
(Continued)

(52) U.S. Cl.
CPC .............. *H04W 76/19* (2018.02); *H04W 8/08* (2013.01); *H04W 8/24* (2013.01); *H04W 12/0431* (2021.01); *H04W 12/06* (2013.01); *H04W 28/0268* (2013.01); *H04W 76/27* (2018.02)

(58) Field of Classification Search
None
See application file for complete search history.

(56) References Cited

U.S. PATENT DOCUMENTS 8,768,305 B1 * 7/2014 Singh ................ H04W 36/0079
455/411
2016/0330787 A1 11/2016 Patel et al.

FOREIGN PATENT DOCUMENTS

CN 101394607 A 3/2009
CN 102027775 A 4/2011
(Continued)

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413 V15.1.0, pp. 1-368, 3rd Generation Partnership Project, Valbonne, France (Mar. 2018).

(Continued)

*Primary Examiner* — Gary Lafontant
(74) *Attorney, Agent, or Firm* — Leydig, Voit & Mayer, Ltd.

(57) ABSTRACT

Embodiments of the present invention provides an information obtaining method and a device. The method is applied to a base station, and includes: sending first information to a mobile management entity (MME), where the first information includes a first request used to re-establish an radio resource control (RRC) connection, the first request is used to instruct the MME to send second information to the base station, the second information includes context information of user equipment (UE) and indication information that is used to indicate connection establishment, and the UE is a UE that requests the RRC connection re-establishment; and receiving the second information. In the embodiments of the present invention, steps in a process of RRC link re-establishment can be reduced, thereby shortening time for re-establishing an RRC connection.

10 Claims, 5 Drawing Sheets

(51) Int. Cl.
*H04W 76/27* (2018.01)
*H04W 12/0431* (2021.01)
*H04W 8/08* (2009.01)
*H04W 8/24* (2009.01)
*H04W 12/06* (2021.01)
*H04W 28/02* (2009.01)

(56) References Cited

FOREIGN PATENT DOCUMENTS

| CN | 106961703 A | 7/2017 |
|----|-------------|--------|
| CN | 106973416 A | 7/2017 |
| WO | 2017122588 A1 | 7/2017 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15)," 3GPP TS 36.300 V15.1.0, pp. 1-341, 3rd Generation Partnership Project, Valbonne, France (Mar. 2018).

Huawei (Rapporteur), "Offline discussion summary of Mobility in NB-IoT enhancements," 3GPP TSG-RAN3 Meeting #94, Reno, USA, R3-162761, total 5 pages, 3rd Generation Partnership Project, Valbonne, France (Nov. 14-18, 2016).

Intel Corporation, "Security of RRC Connection re-establishment of NB-IOT for CP Solution," 3GPP TSG SA WG3 (Security) Meeting #86, Sophia-Anti polis (France), S3-170162, total 6 pages, 3rd Generation Partnership Project, Valbonne, France (Feb. 6-10, 2017).

HW, "RLF situation for control plane CIoT EPS optimizations solution," 3GPP TSG SA WG3 (Security) Meeting #86, Sophia Antipolis (France), S3-170332, total 4 pages, 3rd Generation Partnership Project, Valbonne, France (Feb. 6-10, 2017).

Ericsson, "A solution for RLF in CP NB-IoT," 3GPP TSG-SA WG3 Meeting #86, Sophia Antipolis, France, S3-170254, total 5 pages, 3rd Generation Partnership Project, Valbonne, France (Feb. 6-10, 2017).

* cited by examiner

INFORMATION OBTAINING METHOD AND DEVICE

CROSS-REFERENCE TO RELATED APPLICATIONS

This application is a continuation of International Patent Application No. PCT/CN2018/088239, filed on May 24, 2018, the disclosure of which is hereby incorporated by reference in its entirety.

TECHNICAL FIELD

Embodiments of the present invention relate to the field of communications technologies, and specifically, to an information obtaining method and a device.

BACKGROUND

Narrowband internet of things (NB-IoT) has become an important branch of internet of everything because of its wide coverage, large number of connected devices, and low power consumption. Therefore, that user equipment (UE) obtains information by using NB-IoT has become an important way for obtaining information. In an NB-IoT control plane (CP) scenario, in a process in which UE obtains information by using a network, when a radio resource control (RRC) link fails, the RRC link needs to be re-established to continue to obtain information by using the network. In a process for re-establishing the RRC link, a base station needs context information of the UE, so that the base station needs to obtain the context information of the UE from a mobile management entity (MME). Currently, in the process of RRC link re-establishment, the base station needs to specially send information to obtain the context information of the UE from the MME, and therefore steps in the process of the RRC link re-establishment are added, and time for re-establishing RRC connection is prolonged.

SUMMARY

Embodiments of the present invention disclose an information obtaining method and device, to reduce a process of RRC link re-establishment, thereby shortening time for RRC connection re-establishment.

A first aspect discloses an information obtaining method, where the method is applied to a base station, and the method includes: sending first information that includes a first request used to re-establish an RRC connection to an MME, where the first request may instruct the MME to send, to the base station, second information including context information of UE and indication information that is used to indicate connection establishment; and receiving the second information. The base station may obtain the context information of the UE from the MME by using the first information that includes the first request and the second information that includes the indication information, and does not need to specially send information to obtain the context information of the UE from the MME. Therefore, steps in a process of RRC link re-establishment can be reduced, thereby shortening time for re-establishing an RRC connection. The UE is UE that requests RRC connection re-establishment.

In an embodiment, the base station may receive a second request that is from the UE and that is used to re-establish the RRC connection, so as to send the first information to the MME based on the second request.

In an embodiment, the second request may include key information of the UE, the first information may further include the key information, the key information may instruct the MME to verify, based on the key information, whether the UE is authorized UE, and the MME sends the second information to the base station when the UE is authorized UE.

In an embodiment, the base station may further send re-establishment information to the UE based on the context information of the UE and the indication information, where the re-establishment information may instruct the UE to establish a connection between the UE and the base station based on the re-establishment information.

In an embodiment, the context information of the UE includes capability information of the UE and quality of service (QoS) of the UE. Because the base station obtains the QoS of the UE, transmission efficiency of a subsequent service can be improved.

A second aspect discloses a base station, where the base station includes a unit configured to perform the information obtaining method provided in the first aspect or any one of the possible implementations of the first aspect.

A third aspect discloses a base station. The base station includes a processor, a memory, and a transceiver. The memory is configured to store a program code, the processor is configured to execute a program code, and the transceiver is configured to communicate with UE and an MME. When the processor executes the program code stored in the memory, the processor is enabled to perform the information obtaining method according to the first aspect or any one of the possible implementations of the first aspect.

A fourth aspect discloses a readable storage medium, where a program is stored on the readable storage medium; and when the program runs, the information obtaining method according to the first aspect or any one of the possible implementations of the first aspect is implemented.

A fifth aspect discloses an information obtaining method, where the method is applied to an MME, and the method includes: receiving first information from a base station, where the first information includes a first request used to re-establish an RRC connection; and sending second information to the base station based on the first request, where the second information may include context information of UE and indication information that is used to indicate connection establishment. The MME may send the context information of the UE to the base station by using the second information including the indication information, and does not need to send the context information of the UE to the base station by using dedicated information. Therefore, steps in a process of RRC link re-establishment can be reduced, thereby shortening time for re-establishing an RRC connection. The UE is UE that requests RRC connection re-establishment.

In an embodiment, the first information may further include key information of the UE. The MME may verify, based on the key information, whether the UE is authorized UE, and the MME sends the second information to the base station based on the first request when the UE is authorized UE.

In an embodiment, the indication information may instruct the base station to send, based on the context information of the UE, re-establishment information to the UE, where the re-establishment information is used to instruct the UE to establish a connection between the UE and the base station based on the re-establishment information.

In an embodiment, the context information of the UE may include capability information of the UE and QoS of the UE.

Because the MME sends the QoS of the UE to the base station, transmission efficiency of a subsequent service can be improved.

A sixth aspect discloses an MME, where the MME includes a unit configured to perform the information obtaining method provided in the fifth aspect or any one of the possible implementations of the fifth aspect.

A seventh aspect discloses an MME, including a processor, a memory, and a transceiver, where the memory is configured to store a program code, the processor is configured to execute a program code, and the transceiver is configured to communicate with a base station. When the processor executes the program code stored in the memory, the processor is enabled to perform the information obtaining method according to the fifth aspect or any one of the possible implementations of the fifth aspect.

An eighth aspect discloses a readable storage medium, where a program is stored on the readable storage medium; and when the program runs, the information obtaining method according to the fifth aspect or any one of the possible implementations of the fifth aspect is implemented.

A ninth aspect discloses an information obtaining system, including the base station disclosed in the second aspect and the MME disclosed in the sixth aspect.

DESCRIPTION OF EMBODIMENTS

Embodiments of the present invention disclose an information obtaining method and a device, to reduce a process of RRC link re-establishment, thereby shortening time for RRC connection re-establishment. Detailed descriptions are provided below.

Figure 1:
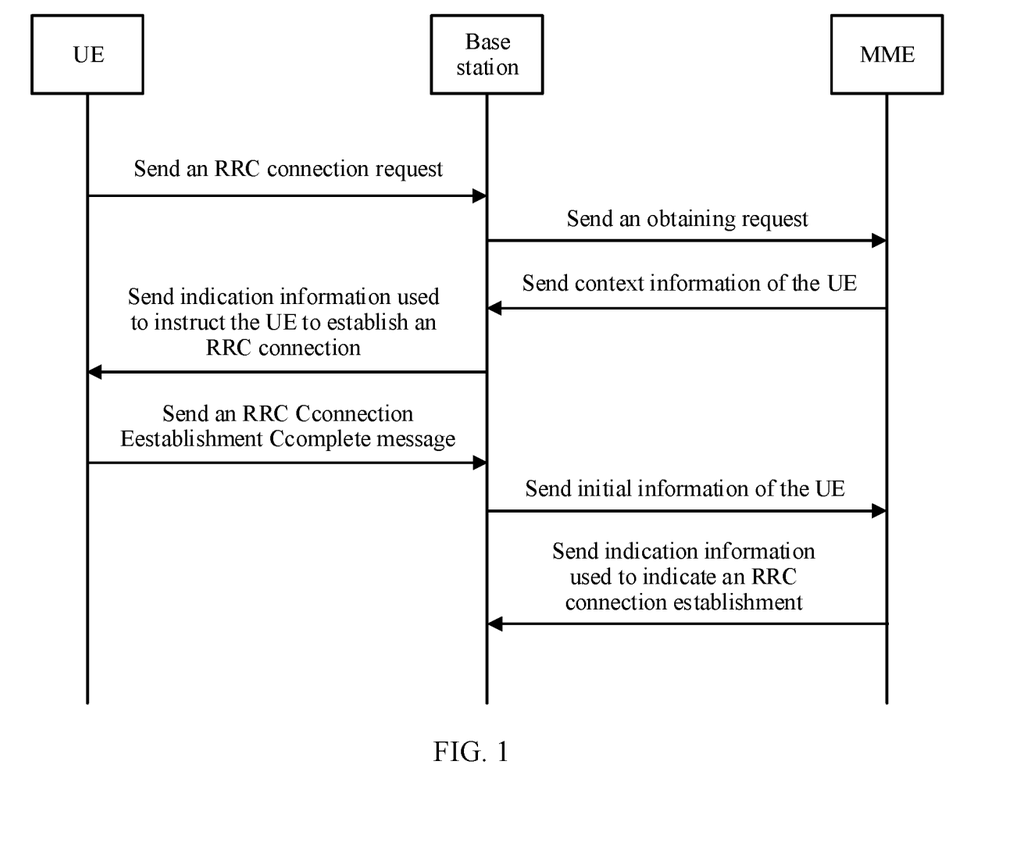
FIG. 1 is a schematic flowchart for initially establishing an RRC connection by UE in an NB-IoT CP scenario disclosed in an embodiment of the present invention.

To facilitate better understanding of the information obtaining method and the device that are disclosed in the embodiments of the present invention, the following first describes an application scenario to which the embodiments of the present invention are applied. FIG. 1 is a schematic flowchart for initially establishing an RRC connection by UE in an NB-IoT CP scenario disclosed in an embodiment of the present invention. As shown in FIG. 1, when UE needs to obtain information from a network, the UE first sends an RRC connection request to a base station, which may be implemented by using an RRC Connection Request message. After receiving the RRC connection request from the UE, the base station sends, to the MME, an obtaining request used to obtain context information of the UE, which may be implemented by using a Retrieve UE Information message. After receiving the obtaining request from the base station, the MME may send the context information of the UE to the base station by using a UE Information Transfer message. After receiving the context information of the UE that is from the MME, the base station sends, to the UE based on the context information of the UE, indication information that is used to instruct the UE to establish an RRC connection, which may be implemented by using an RRC Connection Setup message. After receiving the indication information from the base station, the UE establishes the RRC connection based on the indication information, and then sends an RRC connection establishment complete message to the base station, which may be implemented by using an RRC Connection Setup Complete message. After receiving the RRC connection establishment complete message from the UE, the base station sends initial information of the UE to the MME, which may be implemented by using an Initial UE Message message. After receiving the initial information of the UE from the base station, the MME sends, to the base station, indication information that is used to indicate connection establishment, which may be implemented by using a Connection Establishment Indication message. It can be learned that when the UE initially establishes an RRC connection in the NB-IoT CP scenario, the base station may obtain the context information of the UE from the MME by using the Retrieve UE Information message and the UE Information Transfer message. When the UE re-establishes an RRC connection in the NB-IoT CP scenario, the base station can obtain capability information of the UE from the Connection Establishment Indication message from the MME, but cannot obtain QoS of the UE. Therefore, processes of interaction using the Retrieve UE Information message and the UE Information Transfer message are added for the base station to obtain the QoS of the UE from the MME. As a result, a process of RRC link re-establishment is added, and time for re-establishing RRC connection is prolonged.

Figure 2:
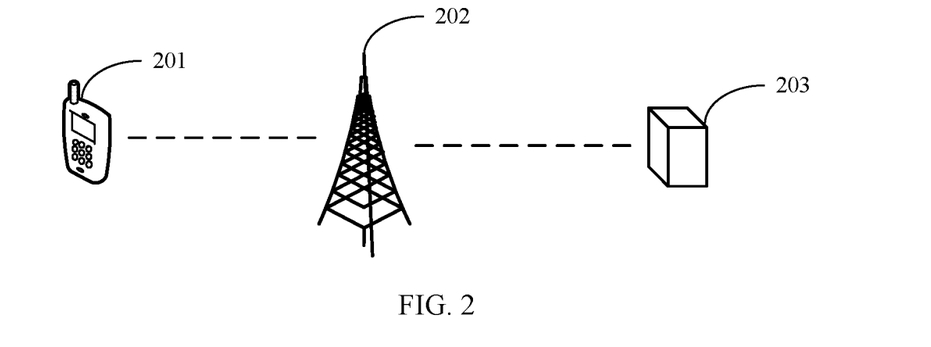
FIG. 2 is a schematic diagram of a network architecture disclosed in an embodiment of the present invention.

To better understand the information obtaining method and the device disclosed in the embodiments of the present invention, the following first describes a network architecture to which an embodiment of the present invention is applied. FIG. 2 is a schematic diagram of a network architecture disclosed in an embodiment of the present invention. As shown in FIG. 2, the network architecture may include UE 201, one or more base stations 202 (only one base station is shown in the figure), and an MME 203. The UE 201 is configured to send information to the base station 202, and receive information from the base station 202. The base station 202 is configured to: receive information from the UE 201 and the MME 203, and send information to the UE 201 and the MME 203. The MME 203 is configured to: receive information from the base station 202, and send information to the base station 202. The base station 202 may be an evolved base station (Evolutional Node B, eNB or eNodeB) in a long term evolution (LTE) system.

Figure 3:
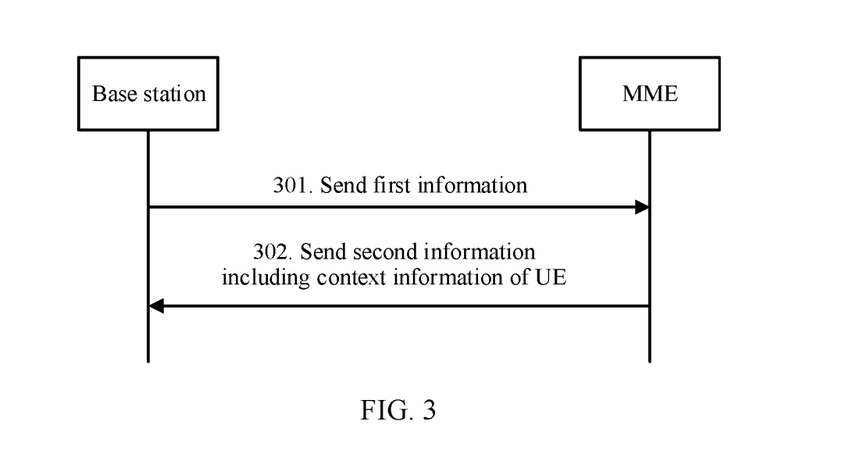
FIG. 3 is a schematic flowchart of an information obtaining method disclosed in an embodiment of the present invention.

Based on the network architecture shown in FIG. 2, FIG. 3 is a schematic flowchart of an information obtaining method disclosed in an embodiment of the present invention. The information obtaining method is described from perspectives of a base station and an MME. As shown in FIG. 3, the information obtaining method may include the following steps.

301. The base station sends first information to the MME.

In this embodiment, in a process of RRC connection re-establishment, the base station sends the first information to the MME, which may be implemented by using an eNB CP Relocation Indication message. The first information includes a first request used to re-establish an RRC connection.

302. The MME sends second information to the base station based on the first request.

In this embodiment, after receiving the first information from the base station, the MME sends the second information to the base station based on the first request, where the second information includes context information of UE and indication information that is used to indicate connection establishment, so that the base station can configure a radio resource for the RRC connection establishment based on the context information of the UE, where the context information of the UE includes capability information of the UE and QoS of the UE, which may be implemented by using a Connection Establishment Indication message or a DOWNLINK NAS TRANSPORT message. Table 1 lists information elements included after the QoS of the UE is added to the Connection Establishment Indication message.

including the first request used to re-establish the RRC connection, and the MME sends, to the base station based on the first request, the second information that includes the context information of the UE and the indication information that is used to indicate connection establishment. It can be learned that the base station may obtain the context information of the UE from the MME by using the first information that includes the first request and the second information that includes the indication information, and does not need to specially send information to obtain the context information of the UE from the MME. Therefore, steps in a process of RRC link re-establishment can be reduced, thereby shortening time for re-establishing the RRC connection. In addition, because the base station obtains the QoS of the UE, transmission efficiency of a subsequent service can be improved.

Figure 4:
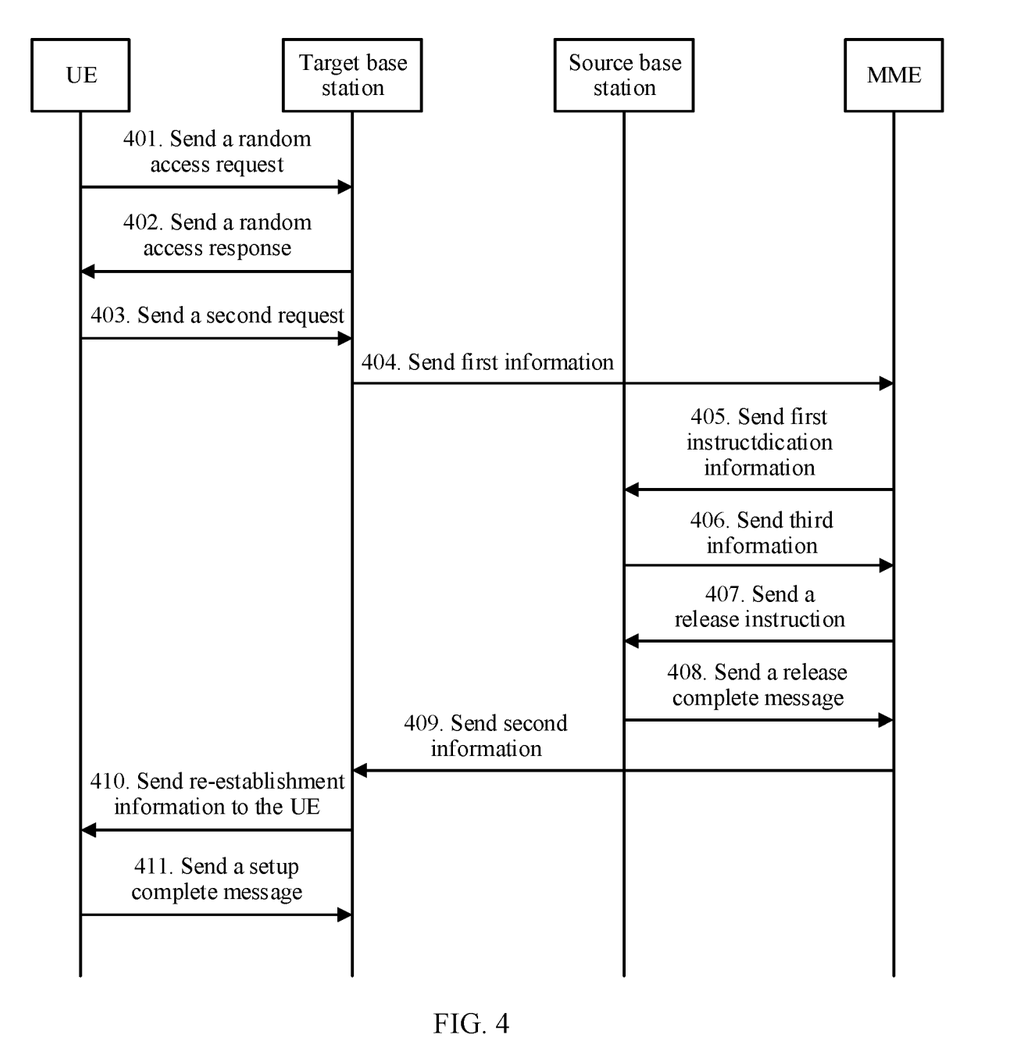
FIG. 4 is a schematic flowchart of another information obtaining method disclosed in an embodiment of the present invention.

Based on the network architecture shown in FIG. 2, FIG. 4 is a schematic flowchart of another information obtaining

TABLE 1

Information elements included in a Connection Establishment Indication message

| IE/Group name | Presence | Range | IE type and reference | Semantics description | Criticality | Assigned criticality |
|---|---|---|---|---|---|---|
| Message Type | M | | 9.2.1.1 | | Yes | Reject |
| MME UE S1AP ID | M | | 9.2.3.3 | | Yes | Ignore |
| eNB UE S1AP ID | M | | 9.2.3.4 | | Yes | Ignore |
| UE Radio Capability | O | | 9.2.1.27 | | Yes | Ignore |
| Enhanced Coverage Restricted | O | | 9.2.1.123 | | Yes | Ignore |
| DL CP Security Information | O | | 9.2.3.49 | | Yes | Ignore |
| UE Level QoS Parameters | O | | E-RAB Level QoS Parameters 9.2.1.15 | Includes QoS parameters. | Yes | Ignore |

Table 2 lists information elements included in the DOWNLINK NAS TRANSPORT message after the QoS of the UE is added.

method disclosed in an embodiment of the present invention. The information obtaining method is described from perspectives of UE, a source base station, a target base

TABLE 2

Information elements included in a DOWNLINK NAS TRANSPORT message

| IE/Group name | Presence | Range | IE type and reference | Semantics description | Criticality | Assigned criticality |
|---|---|---|---|---|---|---|
| Message Type | M | | 9.2.1.1 | | Yes | Ignore |
| MME UE S1AP ID | M | | 9.2.33 | | Yes | Reject |
| eNB UE S1AP ID | M | | 9.2.3.4 | | Yes | Reject |
| NAS-PDU | M | | 9.2.3.5 | | Yes | Reject |
| Handover Restriction List | O | | 9.2.1.22 | | Yes | Ignore |
| Subscriber Profile ID for RAT/Frequency priority | O | | 9.2.1.39 | | Yes | Ignore |
| SRVCC Operation Possible | O | | 9.2.1.58 | | Yes | Ignore |
| UE Radio Capability | O | | 9.2.1.27 | | Yes | Ignore |
| DL NAS PDU Delivery Acknowledgment Request | O | | 9.2.3.48 | | Yes | Ignore |
| Enhanced Coverage Restricted | O | | 9.2.1.123 | | Yes | Ignore |
| UE Level QoS Parameters | O | | E-RAB Level QoS Parameters 9.2.1.15 | Includes QoS parameters. | Yes | Ignore |

In the information obtaining method described in FIG. 3, the base station sends, to the MME, the first information station, and an MME. As shown in FIG. 4, the information obtaining method may include the following steps.

401. The UE sends a random access request to the target base station.

In this embodiment, in an NB-IoT CP scenario, after the UE initially establishes an RRC connection, the UE communicates with a network. In a process in which the UE communicates with the network, when the UE detects a radio link failure (RLF), the UE performs cell reselection, and sends the random access request to the target base station, which may be implemented by using a Random Access Preamble message. The target base station is a base station on which the UE camps after performing cell reselection.

402. The target base station sends a random access response to the UE.

In this embodiment, after receiving the random access request from the UE, the target base station sends the random access response to the UE, which may be implemented by using a Random Access Response message.

403. The UE sends a second request used to re-establish an RRC connection to the target base station.

In this embodiment, after receiving the random access response from the base station, the UE sends the second request to the target base station, which may be implemented by using an RRC Connection Restablishment Request-NB message. The second request is a request used to re-establish the RRC connection, and the second request may include key information of the UE.

404. The target base station sends first information to the MME based on the second request.

In this embodiment, after receiving the second request from the UE, the target base station sends the first information to the MME based on the second request, which may be implemented by using an eNB CP Relocation Indication message. The first information includes the key information of the UE and a first request that is used to re-establish the RRC connection.

405. The MME verifies, based on the key information of the UE, whether the UE is authorized UE. When a verification result is that the UE is authorized UE, the MME sends first indication information to the source base station based on the first request.

In this embodiment, after receiving the first information from the target base station, the MME verifies, based on the key information of the UE, whether the UE is authorized UE. In other words, key information is generated and is used to determine whether the generated key information is the same as the received key information. When the generated key information is the same as the received key information, it indicates that the UE is authorized UE, and the MME sends, based on the first request, the source base station the first indication information that is used to indicate that the UE needs to be migrated, which may be implemented by using an MME CP Relocation Indication message. The source base station is a base station on which the UE camps when the UE detects the RLF.

406. The source base station terminates a downlink path based on the first indication information, and sends third information to the MME.

In this embodiment, after receiving the first indication information, the source base station terminates the downlink path based on the first indication information, in other words, stops sending information to the UE, and sends the third information to the MME, which may be implemented by using a NAS Non Delivery Indication message. The third information is information that should be from the source base station to the UE but has not yet been sent.

407. The MME sends a release instruction to the source base station.

In this embodiment, after receiving the third information from the source base station, the MME sends, to the source base station, the release instruction used to release uplink information, which may be implemented by using a UE Context Release Command message.

408. The source base station releases the uplink information based on the release instruction, and sends a release complete message to the MME.

In this embodiment, after receiving the release instruction from the MME, the source base station deletes, based on the release instruction, information that is from the UE and that should be sent to the MME but has not yet been sent, namely, the uplink information, and then sends the release complete message to the MME, which may be implemented by using a UE Context Release Complete message.

409. The MME sends second information to the target base station.

In this embodiment, after receiving the release complete message from the source base station, the MME sends the second information to the target base station, which may be implemented by using a Connection Establishment Indication message. The second information includes context information of the UE and second indication information that is used to indicate connection establishment. The context information of the UE includes capability information of the UE and QoS of the UE.

410. The target base station sends re-establishment information to the UE.

In this embodiment, after receiving the second information from the MME, the target base station sends the re-establishment information to the UE based on the second indication information and the context information of the UE, which may be implemented by using an RRC Connection Restablishment-NB message.

411. The UE re-establishes the RRC connection based on the re-establishment information and sends an establishment complete message to the target base station.

In this embodiment, after receiving the re-establishment information from the target base station, the UE re-establishes the RRC connection based on the re-establishment information, and sends the establishment complete message to the target base station after the establishment is completed, which may be implemented by using an RRC Connection Restablishment Complete-NB message.

In the information obtaining method described in FIG. 4, the base station may obtain the context information of the UE from the MME by using the first information that includes the first request and the second information that includes the second indication information, and does not need to specially send information to obtain the context information of the UE from the MME, so that steps in a process of RRC link re-establishment can be reduced, thereby shortening time for re-establishing the RRC connection. In addition, because the base station obtains the QoS of the UE, transmission efficiency of a subsequent service can be improved.

Figure 5:
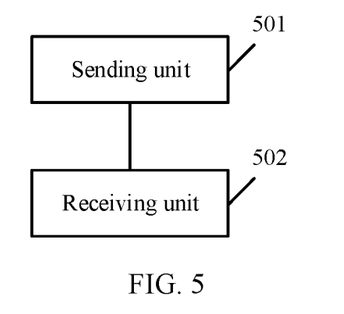
FIG. 5 is a schematic structural diagram of a base station disclosed in an embodiment of the present invention.

Based on the network architecture shown in FIG. 2, FIG. 5 is a schematic structural diagram of a base station disclosed in an embodiment of the present invention. As shown in FIG. 5, the base station may include:

a sending unit 501, configured to send first information to an MME, where the first information includes a first request used to re-establish an RRC connection, the first request is used to instruct the MME to send second information to the base station, the second information includes context information of UE and indication information that is used to indicate connection establishment, and the UE is UE that requests RRC connection re-establishment; and a receiving unit 502, configured to receive the second information.

In a possible implementation, the receiving unit 502 is further configured to receive a second request that is from the UE and that is used to re-establish the RRC connection; and that the sending unit 501 sends the first information to the MME includes:

sending the first information to the MME based on the second request received by the receiving unit 502.

In a possible implementation, the second request may include key information of the UE, and the first information may further include the key information, where the key information is used to instruct the MME to verify, based on the key information, whether the UE is authorized UE.

That the MME sends the second information to the base station includes: When the UE is authorized UE, the MME sends the second information to the base station.

In a possible implementation, the sending unit 501 is further configured to send re-establishment information to the UE based on the context information of the UE and the indication information, where the re-establishment information is used to instruct the UE to establish a connection between the UE and the base station based on the re-establishment information.

In a possible implementation, the context information of the UE includes capability information of the UE and QoS of the UE.

In addition, the base station may further perform the method steps performed by the base station in FIG. 3 and FIG. 4, and may further include another unit that performs the method steps performed by the base station in FIG. 3 and FIG. 4. Details are not described herein again.

Figure 6:
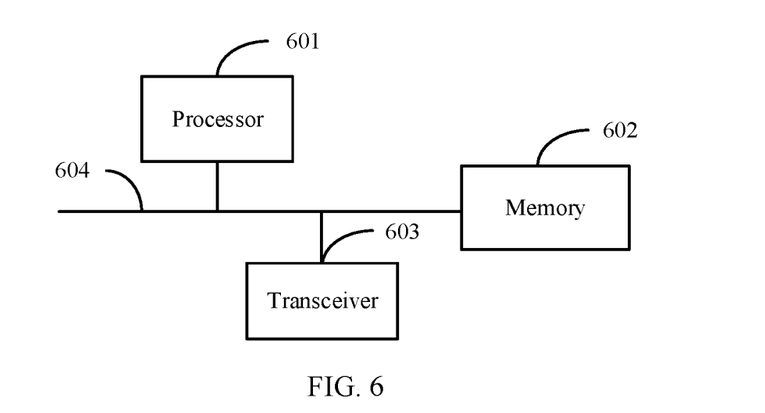
FIG. 6 is a schematic structural diagram of another base station disclosed in an embodiment of the present invention.

Based on the network architecture shown in FIG. 2, FIG. 6 is a schematic structural diagram of another base station disclosed in an embodiment of the present invention. As shown in FIG. 6, the base station may include a processor 601, a memory 602, a transceiver 603, and a bus 604. The processor 601 may be a general-purpose central processing unit (CPU), a plurality of CPUs, a microprocessor, an application-specific integrated circuit (ASIC), or one or more integrated circuits that are configured to control program execution of solutions in the present invention. The memory 602 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other optic disk storage, optical disc storage (including a compact optical disc, a laser disc, an optical disc, a digital general-purpose optical disc, a blu-ray optical disc, or the like), or magnetic disk storage media or other magnetic storage devices, or any other media that can be accessed by a computer and that can be configured to carry or store expected program code in an instruction form or in a data structure form, without being limited thereto. The memory 602 may exist alone, and the bus 604 is connected to the processor 601. Alternatively, the memory 602 may be integrated with the processor 601. The bus 604 may include a channel for transmitting information among the foregoing components. The details are as follows:

The memory 602 stores a group of program code, and the processor 601 is configured to invoke the program code stored in the memory 602 to control the transceiver 603 to perform the following operations:

sending first information to an MME, where the first information includes a first request used to re-establish an RRC connection, the first request is used to instruct the MME to send second information to the base station, the second information includes context information of user equipment UE and indication information that is used to indicate connection establishment, and the UE is UE that requests RRC connection re-establishment; and receiving second information.

In a possible implementation, the transceiver 603 is further configured to receive a second request that is from the UE and that is used to re-establish an RRC connection; and that the transceiver 603 sends the first information to the MME includes:

sending the first information to the MME based on the second request.

In a possible implementation, the second request includes key information of the UE, the first information further includes the key information, and the key information is used to instruct the MME to verify, based on the key information, whether the UE is authorized UE; and that the MME sends the second information to the base station includes: When the UE is authorized UE, the MME sends the second information to the base station.

In a possible implementation, the transceiver 603 is further configured to send re-establishment information to the UE based on the context information of the UE and the indication information, where the re-establishment information is used to instruct the UE to establish a connection between the UE and the base station based on the re-establishment information.

In a possible implementation, the context information of the UE includes capability information of the UE and quality of service QoS of the UE.

Figure 7:
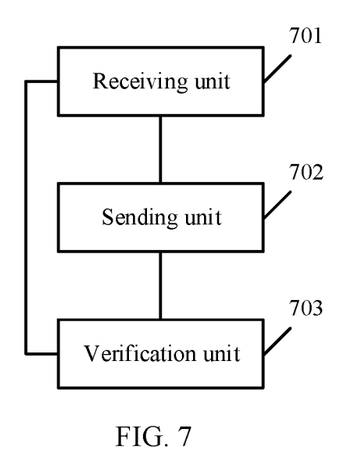
FIG. 7 is a schematic structural diagram of an MME disclosed in an embodiment of the present invention.

Based on the network architecture shown in FIG. 2, FIG. 7 is a schematic structural diagram of an MME disclosed in an embodiment of the present invention. As shown in FIG. 7, the MME may include:

a receiving unit 701, configured to receive first information from a base station, where the first information includes a first request used to re-establish an RRC connection; and a sending unit 702, configured to send second information to the base station based on the first request received by the receiving unit 701, where the second information includes context information of the UE and indication information that is used to indicate connection establishment, and the UE is a UE that requests RRC connection re-establishment.

In a possible implementation, the first information may further include key information of the UE.

The MME may further include:

a verification unit 703, configured to: verify, based on the key information received by the receiving unit 701, whether the UE is authorized UE; and when the UE is authorized UE, trigger the sending unit 702 to send the second information to the base station based on the first request.

In a possible implementation, the indication information is used to instruct the base station to send re-establishment information to the UE based on the context information of the UE, and the re-establishment information is used to instruct the UE to establish a connection between the UE and the base station based on the re-establishment information.

In a possible implementation, the context information of the UE includes capability information of the UE and QoS of the UE.

In addition, the MME may further perform the method steps performed by the MME in FIG. 3 and FIG. 4, and may further include another unit that performs the method steps performed by the MME in FIG. 3 and FIG. 4. Details are not described herein again.

Figure 8:
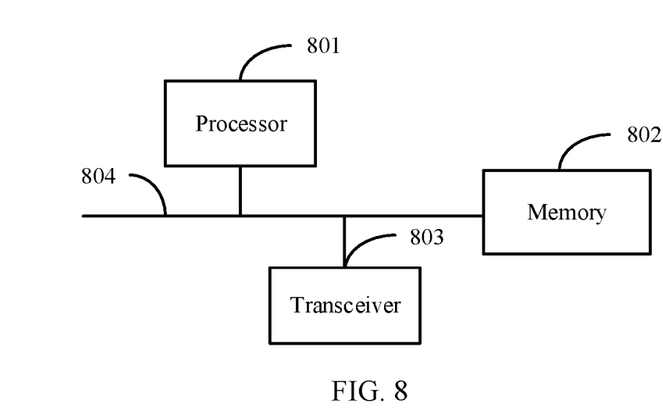
FIG. 8 is a schematic structural diagram of another MME disclosed in an embodiment of the present invention.

Based on the network architecture shown in FIG. 2, FIG. 8 is a schematic structural diagram of another MME disclosed in an embodiment of the present invention. As shown in FIG. 8, the MME may include a processor 801, a memory 802, a transceiver 803, and a bus 804. The processor 801 may be a general-purpose central processing unit (CPU), a plurality of CPUs, a microprocessor, an application-specific integrated circuit (ASIC), or one or more integrated circuits that are configured to control program execution of solutions in the present invention. The memory 802 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other optic disk storage, optical disc storage (including a compact optical disc, a laser disc, an optical disc, a digital general-purpose optical disc, a blu-ray optical disc, or the like), or magnetic disk storage media or other magnetic storage devices, or any other media that can be accessed by a computer and that can be configured to carry or store expected program code in an instruction form or in a data structure form, without being limited thereto. The memory 802 may exist alone, and the bus 804 is connected to the processor 801. Alternatively, the memory 802 may be integrated with the processor 801. The bus 804 may include a channel, used to transmit information among the foregoing components. The transceiver 803 may be a transceiver antenna, or may be another transceiver component. The details are as follows:

The transceiver 803 is configured to receive first information from a base station, where the first information includes a first request used to re-establish an RRC connection.

The transceiver 803 is further configured to send second information to the base station based on the first request, where the second information includes context information of UE and indication information that is used to indicate connection establishment, and the UE is a UE that requests RRC connection re-establishment.

In a possible implementation, the first information may further include key information of the UE.

The memory 802 stores a group of program codes, and the processor 801 is configured to invoke the program code stored in the memory 802 to perform the following operation:

verifying, based on the key information, whether the UE is an authorized UE.

When the UE is authorized UE, the transceiver 803 sends the second information to the base station based on the first request.

In a possible implementation, the indication information is used to instruct the base station to send re-establishment information to the UE based on the context information of the UE, and the re-establishment information is used to instruct the UE to establish a connection between the UE and the base station based on the re-establishment information.

In a possible implementation, the context information of the UE includes capability information of the UE and QoS of the UE.

An embodiment further discloses an information obtaining system. The information obtaining system may include the base station in FIG. 5 and the MME in FIG. 7.

A readable storage medium is further disclosed in an embodiment of the present invention. The readable storage medium stores a program. When the program runs, the information obtaining method shown in FIG. 3 or FIG. 4 is implemented.

A person skilled in the art should be aware that in the foregoing one or more examples, functions described in the present invention may be implemented by hardware, software, firmware, or any combination thereof. When the embodiments of this application is implemented by software, the foregoing functions may be stored in a computer-readable medium or transmitted as one or more instructions or code in the computer-readable medium. The computer readable medium includes a computer storage medium and a communications medium, where the communications medium includes any medium that enables a computer program to be transmitted from one place to another place. The storage medium may be any available medium accessible to a general-purpose or special-purpose computer.

The objectives, the technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. An information obtaining method applied to a target base station in a narrow band interact of things, wherein the method comprises:
   receiving by the target base station, a request from user equipment to re-establish a radio resource control connection to the target base station;
   sending, by the target base station, first information to a mobility management entity in response to the request to re-establish the radio resource control connection to the target base station,
      wherein the first information comprises a first request to re-establish the radio resource control connection with the target base station as requested by the user equipment,
      wherein the user equipment has an ability of being applied in the narrow band internet of things control plane scenario,
      wherein the first request instructs the mobility management entity to send second information to the target base station,
      wherein the second information comprises context information of the user equipment and indication information that indicates connection establishment, and
      wherein the context information comprises capability information of the user equipment and quality of service of the user equipment;
   receiving, by the target base station, the second information from the mobility management entity in response to the target base station sending the first information; and sending re-establishment information to the user equipment based on the contest information of the user equipment comprising the second information,
  wherein the re-establishment information instructs the user equipment to establish a connection between the user equipment and the target base station based on the re-establishment information.

2. The method according to claim 1, further comprising:
receiving a second request from the user equipment to re-establish the radio resource control connection; and
wherein sending the first information to the mobility management entity comprises: sending the first information to the mobility management entity based on the second request.

3. The method according to claim 2, wherein the second request comprises key information of the user equipment, the first information further comprises the key information, and the key information instructs the mobility management entity to verify, based on the key information, whether the user equipment is authorized.

4. The method according to claim 3 wherein the mobility management entity sends the second information to the target base station upon verifying the user equipment is authorized.

5. A target base station applied in a narrow band interact of things comprising a processor, a memory, and a transceiver, wherein the memory stores a group of program code, and the processor is configured to execute the group of program code stored in the memory to control the transceiver to perform the following operations:
  receiving a request from user equipment to re-establish radio resource control connection to the target base station,
    wherein the user equipment has ability of being applied in the narrow band interact of things control plane scenario;
  sending first information to a mobility management entity in response to the request to re-establish the radio resource control connection to the target base station,
    wherein the first information comprises a first request used to re-establish the radio resource control connection with the target base station as requested by the user equipment,
    wherein the first request instructs the mobility management entity to send second information to the target base station,
    wherein the second information comprises context information of the user equipment and indication information that indicates connection establishment, and
    wherein the context information comprises capability information of the user equipment and quality of service of the user equipment;
  receiving the second information from the mobility management entity in response to the tamer base station sending the first information; and
  sending re-establishment information to the user equipment based on the context information of the user equipment comprising, the second information,
    wherein the re-establishment information instructs the user equipment to establish a connection between the user equipment and the target base station based on the re-establishment information.

6. The target base station according to claim 5, wherein the transceiver is further configured to cooperate with the processor to receive a second request from the user equipment and used to re-establish the radio resource control connection; and
  sending the first information to the mobility management entity based on the second request.

7. The target base station according to claim 6, wherein the second request comprises key information of the user equipment, the first information further comprises the key information, and the key information instructs the mobility management entity to verify, based on the key information, whether the user equipment is authorized.

8. A non-transitory computer-readable storage medium comprising a program stored thereon which, when executed by a processor of a target base station, cause the target base station applied in narrow band interact of things to perform operations including:
  receiving, a request from user equipment to re-establish a radio resource control connection to the target base station,
    wherein the user equipment has ability of being applied in the narrow band internet of things control plane scenario;
  sending, by the target base station, first information to a mobility management entity in response to the request to re-establish the radio resource control connection to the target base station,
    wherein the first information comprises a first request to re-establish the radio resource control connection with the target base station as requested by the user equipment,
    wherein the first request instructs the mobility management entity to send second information to the target base station,
    wherein the second information comprises context information of the user equipment and indication information that indicates connection establishment, and
    wherein the context information comprises capability information of the user equipment and quality of service of the user equipment;
  receiving, by the target base station, the second information from the mobility management entity in response to the target base station sending the first information; and
  sending re-establishment information to the user equipment based on the context information of the user equipment comprising the second information,
    wherein the re-establishment information instructs the user equipment to establish a connection between the user equipment and the target base station based on the re-establishment information.

9. The non-transitory computer-readable storage medium according to claim 8, wherein the operations further comprise:
  receiving a second request from the user equipment and used to re-establish the radio resource control connection; and
  sending the first information to the mobility management entity based on the second request.

10. The non-transitory computer-readable storage medium according to claim 9, wherein the second request comprises key information of the user equipment, the first information further comprises the key information, and the key information instructs the mobility management entity to verify, based on the key information, whether the user equipment is authorized.

* * * * *

UNITED STATES PATENT AND TRADEMARK OFFICE
CERTIFICATE OF CORRECTION

PATENT NO. : 11,641,688 B2
APPLICATION NO. : 17/102206
DATED : May 2, 2023
INVENTOR(S) : Zhao et al.

It is certified that error appears in the above-identified patent and that said Letters Patent is hereby corrected as shown below:

In the Claims

Claim 1: Column 12, Line 38: "interact" should read -- internet --.

Claim 1: Column 12, Line 40: "receiving" should read -- receiving, --.

Claim 1: Column 13, Line 2: "contest" should read -- context --.

Claim 5: Column 13, Line 26: "interact" should read -- internet --.

Claim 5: Column 13, Line 37: "interact" should read -- internet --.

Claim 5: Column 13, Line 57: "tamer" should read -- target --.

Claim 8: Column 14, Line 15: "interact" should read -- internet --.

Signed and Sealed this
Twenty-ninth Day of August, 2023

Katherine Kelly Vidal
*Director of the United States Patent and Trademark Office*